R. W. PRESTON.
DUST SEPARATOR.
APPLICATION FILED APR. 24, 1913.
1,110,344.
Patented Sept. 15, 1914.
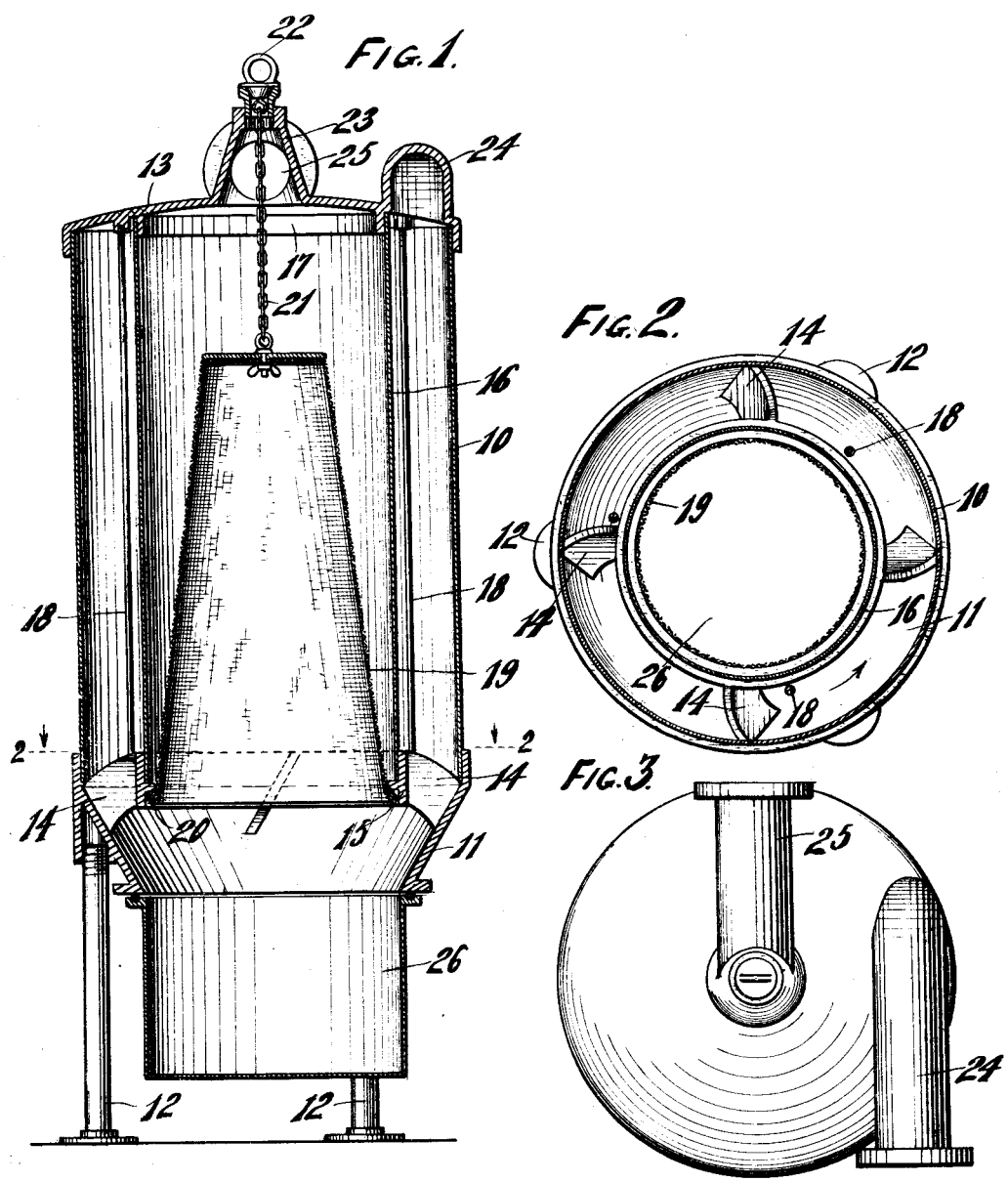

UNITED STATES PATENT OFFICE.

RAY W. PRESTON, OF CONNERSVILLE, INDIANA, ASSIGNOR TO UNITED VACUUM APPLIANCE COMPANY, OF PATERSON, NEW JERSEY, A CORPORATION OF NEW JERSEY.

DUST-SEPARATOR.

1,110,344.

Specification of Letters Patent.

Patented Sept. 15, 1914.

Application filed April 24, 1913. Serial No. 763,186.

*To all whom it may concern:*

Be it known that I, RAY W. PRESTON, a citizen of the United States, and resident of Connersville, in the county of Fayette and State of Indiana, have invented new and useful Improvements in Dust-Separators, of which the following is a description, reference being had to the accompanying drawings, which are a part of this specification.

This invention has for its object to provide a dust separator for vacuum cleaners and the like for removing dust from air, though the means employed are adapted for use in separating sawdust or other particles of foreign matter from air in motion.

An object of the invention is to provide a dust separator by which a preliminary separation of the heavier particles of dust or other foreign matter may be made by centrifugal action as the result of a rapid circular motion given to the air before it enters the strainer.

Another object of the invention is to accomplish this purpose by discharging the air tangentially into an annular space between concentric walls and giving it a downward course therethrough.

Another object of the invention is to provide a flexible suspending means for the upper end of an inverted strainer bag which will permit of the bag being shaken to discharge the dust therefrom, either by the action of the current of air therethrough or by jerking such suspending means from the outside of the device.

Another object of the invention is to perfect details of construction of a dust separator of this character.

With the above and other objects in view the invention consists in the dust separator as herein claimed and all equivalents.

Referring to the accompanying drawings in which like characters of reference indicate the same parts in different views: Figure 1 is a central sectional view of a dust separator constructed in accordance with this invention; Fig. 2 is a sectional plan view thereof on the plane of line 2—2 of Fig. 1; and, Fig. 3 is a plan view thereof.

In these drawings 10 indicates a cylindrical casing mounted on a hopper shaped base 11 supported by legs 12 or otherwise and 13 is the cover therefor. The base 11 has inclined blade-like ribs 14 supporting an internally flanged ring 15 concentric with the base and an inner cylinder 16 fits at its lower end in the ring 15 against the flange thereof while its upper end fits around a depending annular flange 17 on the cover 13. The ring 15 and its supporting ribs 14 are preferably integral with the base 11 and the entire structure is bound together by a series of rods or studs 18 connecting the cover to the base and passing through the annular space between the inner cylinder 16 and the outer cylindrical casing 10.

A strainer bag 19 has its mouth secured to the ring 15 by means of a spring wire ring 20 engaged beneath the flange of ring 15 and this strainer bag is inverted with its upper end suspended by means of a chain 21 or other flexible means which connects with a shaker plug 22 fitting in a socket in the raised dome 23 at the center of the cover. The cover is formed with an inlet pipe 24 communicating with the annular space between the two concentric cylindrical walls and this inlet pipe is tangential to such annular space. The cover is also provided with an outlet pipe 25 leading from the dome 23 and communicating with the space within the inner cylinder 16 above the strainer bag. A bucket 26 is removably clamped and sealed to the bottom opening of the base 11 to catch the dust.

In operation dust laden air enters the dust separator through the tangential inlet pipe 24 and descends through the annular space between the concentric cylindrical walls with a whirling motion that will cause the heavier particles of dust and foreign matter to be driven outwardly and downwardly along the walls of the cylindrical casing and the inclination of the blades or ribs 14 is such as to assist in directing the dirt downwardly through the hopper-shaped base into the bucket 26. Thus the coarser particles of foreign matter are separated from the air by centrifugal action within the annular space between the concentric cylindrical walls and when the air reaches the mouth of the strainer bag it passes upwardly therethrough leaving the finer particles of dust and discharges from the dust separator through the outlet pipe 25.

The air containing the foreign matter is forced by the tangential inlet into a centrifugal motion in the space between the annular cylindrical walls. The distance between the concentric cylindrical walls is so narrow as to maintain centrifugal velocity of the air until it reaches the bottom. This forces the heavier particles in the air away from the edge of the inner cylinder and they fall into the removable bucket below. The air currents containing now only the comparatively light particles curve under the edge of the inner cylinder. In this large diameter passage within the inner cylinder the air velocity falls allowing a further percentage of the foreign matter to be precipitated. Because of these combined separating actions only the lightest particles of dust are carried against the filtration bag. Therefore under continued use no great accumulation of foreign matter can settle on the bag to lessen the separation efficiency and hinder the passage of air. The central outlet distributes the air currents and allows an even pull on the bag. The bag with this arrangement can be made smaller than the outside casing for easy handling, and still allow the bag to be accessible and removable from the bottom. The bag is pulled tightly against the flange so that it cannot loosen and stop the outlet pipe. In this arrangement of the bag it is self cleaning to a degree, for sudden fluctuations in the air velocity cause the bag to vibrate and shake the dust therefrom. The bag may also be shaken by pulling upon the shaker plug 22.

What I claim as new and desire to secure by Letters Patent is:

1. A dust separator comprising an exterior chamber, an interior chamber, a dust collector comprising a hopper adjacent the lower end of the exterior chamber, a ring adjacent the lower end of the interior chamber, supporting means for the ring comprising a plurality of downwardly inclined deflecting members mounted in the hopper, an inverted strainer bag and means for securing said bag within the interior chamber above the dust collector.

2. A dust separator, comprising a cylindrical casing, an inner cylinder concentric therewith forming an annular passageway between them, a cover for the casing, a hopper-shaped base on which the casing is mounted, inwardly projecting ribs on the base, an internally flanged ring supported by the ribs and having the inner cylinder fitting therein, a bucket detachably secured to the base, an inlet pipe on the cover tangential to the annular passageway, an outlet pipe on the cover leading from the space within the inner cylinder, and an inverted strainer bag with its mouth secured to the flange of the ring.

In testimony whereof, I affix my signature, in presence of two witnesses.

RAY W. PRESTON.

Witnesses:
JOHN T. WILKIN,
J. E. HUSTON.